US011620769B2

(12) United States Patent
Tang et al.

(10) Patent No.: US 11,620,769 B2
(45) Date of Patent: *Apr. 4, 2023

(54) VEHICLE INFORMATION PHOTO OVERLAY

(71) Applicant: Capital One Services, LLC, McLean, VA (US)

(72) Inventors: Qiaochu Tang, The Colony, TX (US); Geoffrey Dagley, Mckinney, TX (US); Micah Price, Plano, TX (US); Avid Ghamsari, Frisco, TX (US); Jason Richard Hoover, Grapevine, TX (US)

(73) Assignee: Capital One Services, LLC, McLean, VA (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/025,530

(22) Filed: Sep. 18, 2020

(65) Prior Publication Data

US 2021/0217208 A1 Jul. 15, 2021

Related U.S. Application Data

(63) Continuation of application No. 16/742,210, filed on Jan. 14, 2020, now Pat. No. 10,818,042.

(51) Int. Cl.
*G06T 11/00* (2006.01)
*G06K 9/62* (2022.01)
*G06V 30/413* (2022.01)

(52) U.S. Cl.
CPC .......... *G06T 11/00* (2013.01); *G06K 9/6262* (2013.01); *G06V 30/413* (2022.01)

(58) Field of Classification Search
CPC .... G06T 11/00; G06K 9/6262; G06V 30/413; G06V 2201/08; G06V 20/59; G06V 20/20
See application file for complete search history.

(56) References Cited

U.S. PATENT DOCUMENTS 5,414,626 A 5/1995 Boorse et al.
7,421,322 B1 9/2008 Silversmith et al.
(Continued)

FOREIGN PATENT DOCUMENTS

CN 107403162 A 11/2017

OTHER PUBLICATIONS

U.S. Appl. No. 16/742,210, "Vehicle Information Photo Overlay", to Qiaochu Tang, filed Jan. 14, 2020, Specification, Drawings and Claims only Considered.

*Primary Examiner* — Aaron W Carter
(74) *Attorney, Agent, or Firm* — Sterne, Kessler, Goldstein & Fox P.L.L.C.

(57) ABSTRACT

An image information overlay system retrieves an image associated with a vehicle listing and uses machine learning models to classify the image, generating identification data that may comprise a vehicle make and model, a feature or part of the vehicle present in the image, and a location of the vehicle feature or part. The identification data or an individual identifier of the vehicle, such as a Vehicle Identification Number (VIN), may be used to retrieve overlay information related to the vehicle make and model, such as recalls or known maintenance issues or information specific to the vehicle, such as mileage, accident reports, or ownership history. The overlay information is displayed on the image as an overlay at the location of the vehicle feature or part corresponding to the overlay information.

12 Claims, 8 Drawing Sheets

(56) References Cited

U.S. PATENT DOCUMENTS

| | | |
|---|---|---|
| 8,548,866 B2 | 10/2013 | Varadarajan et al. |
| 10,002,442 B1 | 6/2018 | Dagley et al. |
| 10,026,209 B1 | 7/2018 | Dagley et al. |
| 10,140,553 B1 * | 11/2018 | Vasisht ............... G06N 3/0481 |
| 10,152,648 B2 | 12/2018 | Filimonova |
| 10,319,007 B1 * | 6/2019 | Tang ................. G06F 16/5866 |
| 10,319,094 B1 * | 6/2019 | Chen ....................... G06N 3/08 |
| 10,325,315 B1 | 6/2019 | Tang et al. |
| 10,395,313 B1 | 8/2019 | Tang et al. |
| 10,452,915 B1 | 10/2019 | Chikkaveerappa et al. |
| 10,818,042 B1 * | 10/2020 | Tang ................... G06K 9/6262 |
| 10,832,400 B1 | 11/2020 | Tang et al. |
| 10,984,503 B1 * | 4/2021 | Otten ....................... G06T 3/40 |
| 2004/0093284 A1 | 5/2004 | Takaoka et al. |
| 2008/0077508 A1 | 3/2008 | Bezos et al. |
| 2011/0270706 A1 | 11/2011 | Anspach et al. |
| 2012/0116728 A1 | 5/2012 | Shear et al. |
| 2012/0230548 A1 | 9/2012 | Caiman et al. |
| 2013/0222133 A1 | 8/2013 | Schultz et al. |
| 2015/0254762 A1 | 9/2015 | Fisher |
| 2015/0324737 A1 | 11/2015 | Chrzan et al. |
| 2016/0163129 A1 | 6/2016 | Elnajjar |
| 2017/0061506 A1 | 3/2017 | Dow et al. |
| 2017/0278179 A1 | 9/2017 | Perrier et al. |
| 2018/0173953 A1 * | 6/2018 | Ghata .................... G06V 10/82 |
| 2018/0249217 A1 | 8/2018 | Andrews, II et al. |
| 2018/0260793 A1 * | 9/2018 | Li .......................... G06N 7/005 |
| 2018/0260825 A1 | 9/2018 | Rashid et al. |
| 2019/0019335 A1 | 1/2019 | Elangovan et al. |
| 2019/0172112 A1 | 6/2019 | Sierocki |
| 2019/0278994 A1 | 9/2019 | Bumpas et al. |
| 2019/0279033 A1 | 9/2019 | Price et al. |
| 2019/0279144 A1 | 9/2019 | Yang et al. |
| 2019/0279293 A1 | 9/2019 | Tang et al. |
| 2019/0295030 A1 | 9/2019 | Candeloro, Jr. et al. |
| 2020/0050856 A1 | 2/2020 | Chikkaveerappa et al. |
| 2021/0217154 A1 | 7/2021 | Tang et al. |

* cited by examiner

VEHICLE INFORMATION PHOTO OVERLAY

CROSS-REFERENCE TO RELATED APPLICATIONS

This application is a continuation of U.S. application Ser. No. 16/742,210 filed on Jan. 14, 2020, which is incorporated by reference herein.

BACKGROUND

A listing for a new or used vehicle for sale may be displayed to potential buyers through a web interface. The listing often includes a text portion and one or more images of the vehicle offered for sale. Vehicle features and specifications may be displayed in the text portion of the web interface. Vehicle title history, such as mileage, accident reports, recalls, etc. corresponding to the vehicle may be available through a third-party vehicle title history service. Potential buyers bear the burden of finding information they consider relevant to their purchase decision, such as vehicle features, specifications, and title history, wherever that information is displayed in the text portion of the web interface or by accessing another third-party service.

BRIEF SUMMARY

In some embodiments, a method of overlaying information on an image comprises retrieving an image using an image identifier and classifying the image to generate identification data and a feature location for the image. Based on the identification data and/or an individual identifier corresponding to the image, the method retrieves overlay information from a database. The method may determine a location of the image in a display and may display the overlay information at the feature location in the image.

In some embodiments, a method for overlaying information on an image comprises selecting an image identifier in a hypertext document and classifying an image identified by the image identifier to generate identification data for the image. The method identifies a feature location within the image. The method may select overlay information based on the identification data and display the overlay information on the image based on the feature location.

In some embodiments, the method further comprises identifying a feature at the feature location and selecting the overlay information based on a feature identifier corresponding to the identified feature.

In some embodiments, the method further comprises identifying an individual identifier in the hypertext document and selecting the overlay information based on the individual identifier.

In some embodiments, the selecting of the image identifier comprises selecting, as the image identifier, an image identifier nearest, in a display of the hypertext document, to the identified individual identifier.

In some embodiments, the method further comprises selecting the image identifier based on one or more of a threshold of an image size corresponding to the image identifier, a ratio between a length of the image and a width of the image, or visibility, in a display of the hypertext document, of an image corresponding to the image identifier.

In some embodiments, the displaying of the overlay image comprises determining, based on a layout of a display of the hypertext document, a location of the image identified by the image identifier and displaying the overlay information at the feature location in the image based on the location of the image in the display of the hypertext document.

In some embodiments, the method uses a first machine learning model to classify the image in a first general image class and uses a second machine learning model to generate a general identifier for the image. The general identifier may correspond to one of multiple sub-classes within the first general image class. The selecting of the overlay information may comprise selecting the overlay information based on the general identifier.

In some embodiments, the method further comprises using a third machine learning model to identify a feature in the image and determine the feature location in the image. The third machine learning model may generate identification data comprising a feature identifier corresponding to the identified feature. The third machine learning model may be configured to identify the feature based on an image set corresponding to the general identifier.

In some embodiments, the method selects multiple image identifiers and classifies the images identified by the multiple image identifiers to determine an image in a first general image class and generate the general identifier for the determined image.

In some embodiments, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

The embodiments described with reference to the figures describe a system and method for displaying vehicle information overlaid on a vehicle image. Vehicle information may be overlaid on vehicle features or parts corresponding to the overlay information. The embodiments are described with specific examples given in relation to a web plugin configured to display the overlay information on images displayed in vehicle listings in a web interface. However, a person of ordinary skill in the art would understand that the principles disclosed herein may be applied in other user interfaces, including a vehicle dealership database, vehicle configurators, vehicles listed by individual sellers on a computerized marketplace, or similar applications using any kind of computing device.

Figure 1:
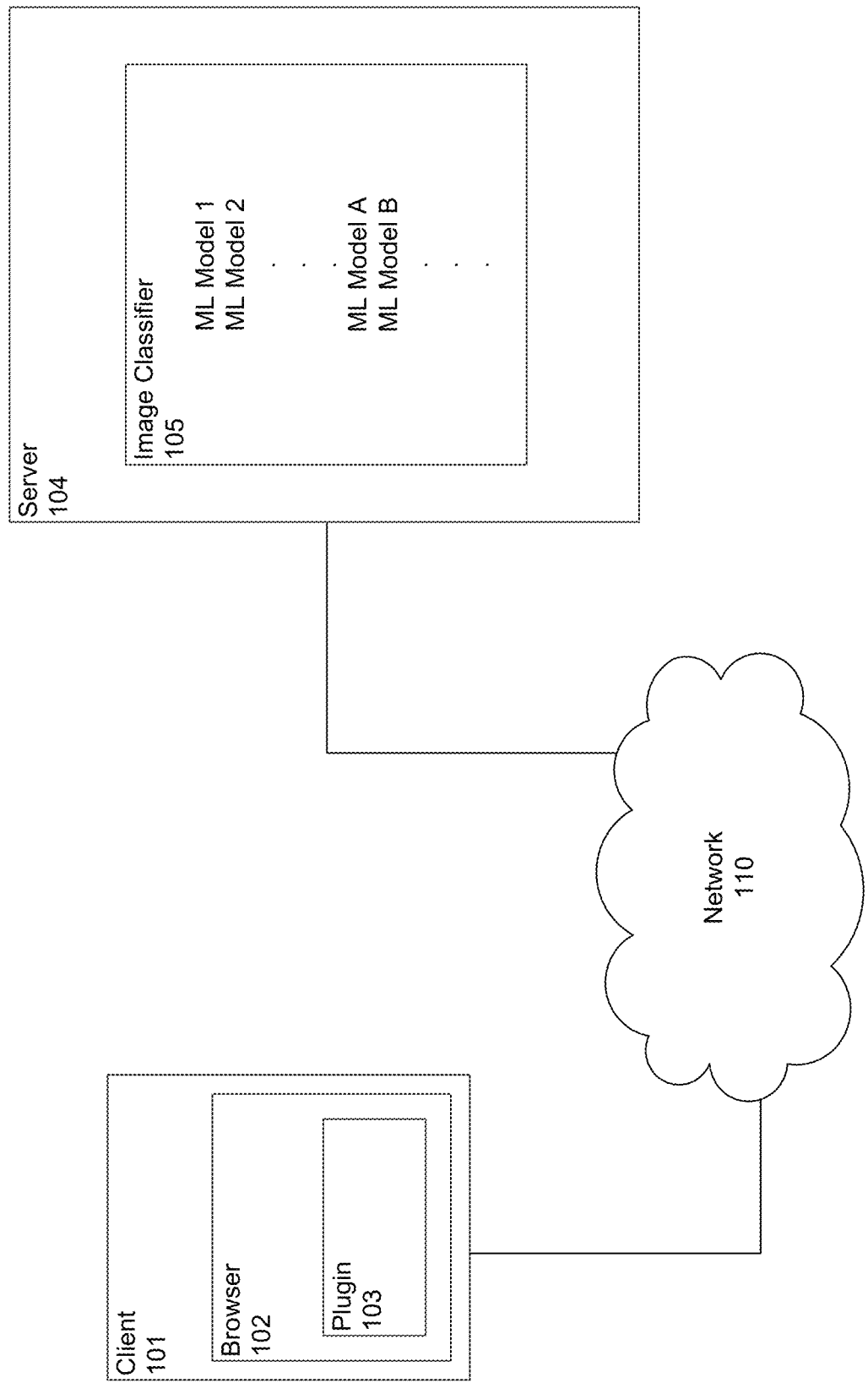
FIG. 1 is a block diagram of an image information overlay system according to some embodiments.

FIG. 1 is a block diagram of an image information overlay system according to some embodiments.

According to some embodiments, the image information overlay system comprises a client 101 computer system and a server 104. The client 101 computer system and the server 104 may be configured to perform the functions of the image information overlay system as described herein. According to some embodiments, the client 101 may comprise a web browser 102, and a plugin 103 configured to augment the browser with one or more aspects of the image information overlay system functionality. According to some embodiments, the server may be configured to host an image classifier 105. The image classifier 105 may comprise one or more machine learning (ML) models configured to classify a vehicle image and generate identification data for the image. Identification data may comprise one or more of a feature identifier that describes a feature of the image, a feature location indicating the location of the feature in the image, a general image class (e.g., vehicle, non-vehicle, vehicle exterior, vehicle interior), a general identifier corresponding to the vehicle in the image, and/or an individual identifier for the vehicle in the image. One or more of the machine learning models of the image classifier 105 may be configured to identify a feature in the image and a feature location in the image. According to some embodiments, the overlay information may be displayed at the feature location on the image.

Some machine learning models applicable to the disclosed embodiments may be configured to perform image recognition and/or image classification tasks. Image classification may include classifying an image as a vehicle image, a vehicle exterior, a vehicle interior, a three-quarters profile vehicle image or another vehicle perspective image. For some of the specific vehicle features, detecting the location of the feature in an image and returning box coordinates may be preferred. Machine learning models and neural network architectures of the disclosed embodiments may include, but are not limited to, Convolutional Neural Networks (CNNs), Inception, ResNet and NASNet, Region-based CNN (R-CNN), You Only Look Once (YOLO), and Single Shot Detector (SSD). The disclosed embodiments may also employ other machine learning approaches including logistic regression, support vector machines (SVM), or tree-based methods like random forests and gradient boosting machines (GBM). Preprocessing techniques, also known as feature creation or feature transformation, may also be used to convert the pixel data of the image into features for the machine learning models to identify. Some preprocessing techniques may include, but are not limited to, histogram of oriented gradients (HOG), scale-invariant feature transform (SIFT), or features from accelerated segment test (FAST). A non-neural network-based object detection method of the disclosed embodiments may include a Viola-Jones object detection framework, which uses Haar features.

Convolutional Neural Networks (CNNs) are current state-of-the-art machine learning modeling techniques for image classification problems, with other useful neural network architectures including Inception, ResNet and NASNet for image recognition, and Region-based CNN (R-CNN), You Only Look Once (YOLO), and Single Shot Detector (SSD) for object detection. It is also possible to apply other machine learning approaches including logistic regression, support vector machines (SVM), or tree-based methods like random forests and gradient boosting machines (GBM). These other machine learning approaches may involve using preprocessing techniques, such as feature creation or feature transformation, to convert the pixel data of the image into features the other machine learning approaches can operate on. These preprocessing techniques may include histogram of oriented gradients (HOG), scale-invariant feature transform (SIFT), or features from accelerated segment test (FAST).

According to some embodiments, the client 101 and server 104 are connected by a network 110. The plugin 103 may be configured to interact with the image classifier 105 by connecting to the server through the network 110. According to some embodiments, the plugin 103 may be configured to identify an image in a hypertext document displayed in the web browser 102, and send a request for image classification to the image classifier 105. The hypertext document may be a vehicle listing. The functions of the client and server may also be implemented on a single computer system, in a cloud computing environment, or through any computing system configuration.

According to some embodiments, the image information overlay system may display overlay information on a vehicle image. The overlay information may comprise information specific to the individual vehicle, such as mileage, accident reports, maintenance history, or ownership history or information generally applicable to the make and model of the vehicle, such as known maintenance issues, manufacturer recalls, or real-world fuel economy data. Overlay information may be retrieved based on identification data available in a hypertext document associated with the vehicle, or based on detecting a vehicle make and model using an image classifier 105. The identification data available in the hypertext document may comprise an individual identifier, such as a Vehicle Identification Number (VIN) associated with the vehicle, and/or a general identifier such as an indicator of the vehicle make and model. The image classifier 105 may also generate identification data used to retrieve overlay information.

Overlay information may be overlaid on the image at a feature location, in the image, corresponding to the overlay information being displayed. An image classifier 105 may be used to identify the feature location, in the image, where the overlay information is to be displayed. According to some embodiments, the image information overlay system may display overlay information in a general location of the image, not specific to any particular feature of the image, or in a location that does not obscure the vehicle in the image. Overlay information may be displayed directly on the image or in an overlay information pop-up. An overlay information pop-up may be associated with an icon displayed in a general location on the image, or displayed at a feature location in the image.

Figure 2:
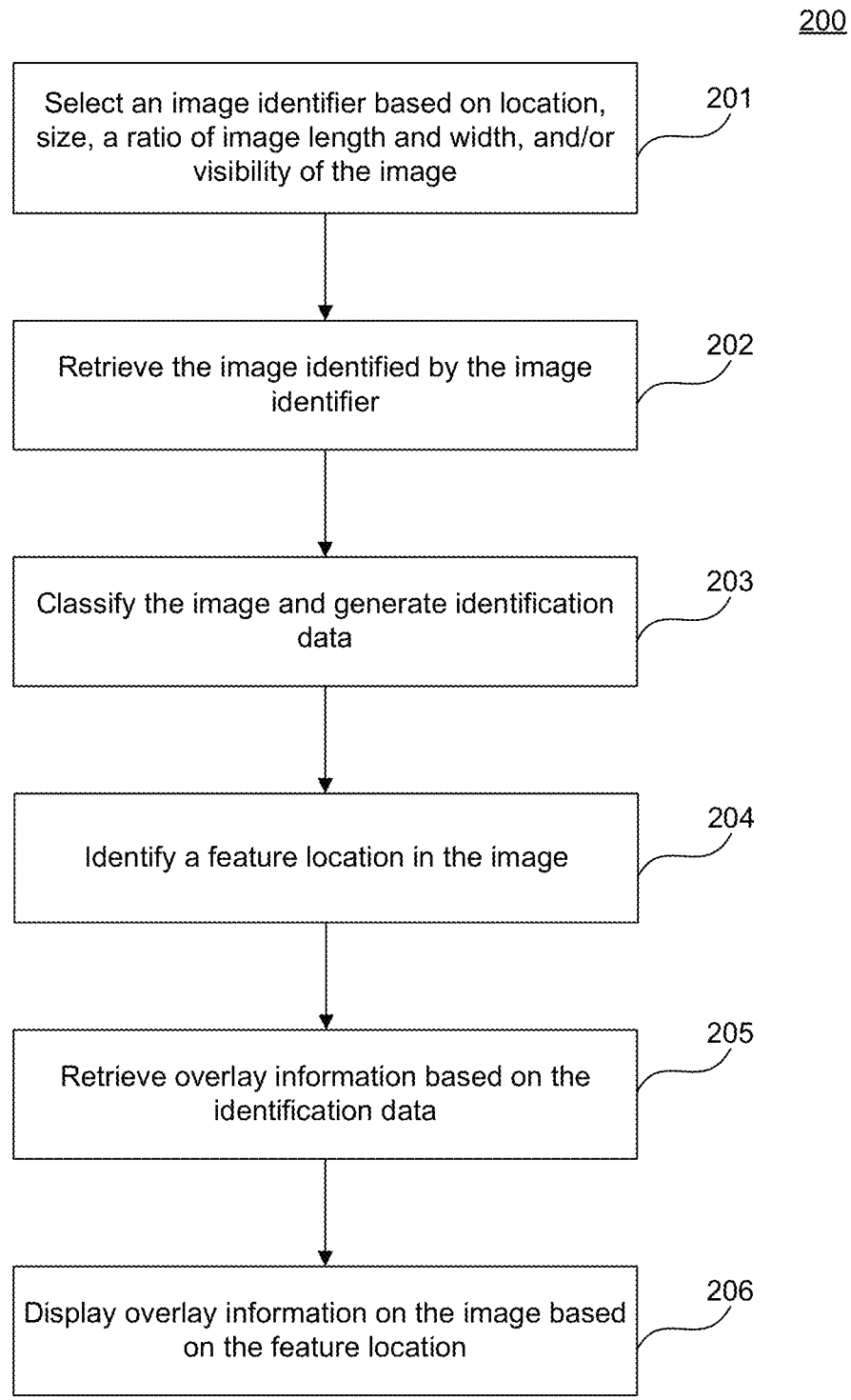
FIG. 2 is a flow chart for a method of image information overlay according to some embodiments.

FIG. 2 is a flow chart for a method of image information overlay according to some embodiments. It is to be appreciated the steps may not occur in the order shown, not all steps may be performed, and additional steps may be performed, depending on various applications.

According to some embodiments, the image information overlay system may be configured to operate on a hypertext document displayed in a web browser. The image information overlay system may be configured as a web plugin which operates automatically on a whitelist of domains. The whitelist of domains may comprise a list of domains known to be a vehicle dealership site, a vehicle classified advertisement site, a vehicle review site, or another site having vehicle images and vehicle information. When the browser accesses a domain on the whitelist, the image information overlay system may be triggered to search for vehicle images. At step 201, the image information overlay system selects an image identifier in the hypertext document. The image identifier may comprise a path to a local or remote storage location. The path may comprise a universal resource locator (URL) identifying a location where the image is stored. The image information overlay system may select the image identifier based on one or more of the position of the image in the hypertext document, image size, a ratio of image length and width, or visibility of the image.

According to some embodiments, the image information overlay system may identify an individual identifier in the hypertext document and select the image identifier based on proximity to the individual identifier. The image information overlay system may select the image identifier nearest to the individual identifier in the display of the hypertext document in the web browser 103. The individual identifier may be a vehicle identification number (VIN) included in the hypertext document.

At step 202, the image information overlay system may retrieve the image identified by the image identifier. The image may be retrieved by accessing the network location identified by the URL and copying the image to local storage. In the case that the path identifies a local storage location, the image may be retrieved by copying the image into memory suitable for the image classifier 105 to perform image classification on the image.

At step 203, the image information overlay system uses the image classifier 105 to classify the image and generate identification data for the image corresponding to the image identifier. According to some embodiments, the identification data may comprise a general identifier. The general identifier may indicate a make and model of the vehicle. At step 204, the image information overlay system may use the image classifier 105 to identify a feature location corresponding to one or more features identified in the image.

At step 205, the image information overlay system retrieves overlay information based on the identification data. According to some embodiments, the image information overlay system accesses one or more vehicle databases to retrieve overlay information, such as known maintenance issues, manufacturer recalls, or real-world fuel economy data. The overlay information may correspond to a general identifier indicating a make and model of the vehicle in the identification data. The one or more vehicle databases may comprise a third-party database and/or a local database storing information generally applicable to vehicles based on the make and model of the vehicle.

According to some embodiments, the image information overlay system may access one or more vehicle databases and use an individual identifier, from the identification data, to retrieve overlay information specific to the vehicle, such as mileage, accident reports, maintenance history, or ownership history. The individual identifier may be a vehicle identification number (VIN) included in the hypertext document. The one or more vehicle databases may comprise a vehicle title history database.

According to some embodiments, the image information overlay system retrieves overlay information based on identified features included in the identification data. As a non-limiting example, the identification data may comprise a feature of alloy wheels. The image information overlay system may access one or more vehicle databases to retrieve overlay information identifying whether the alloy wheels are stock wheels or a dealer installed option, or installed by a previous or current owner.

Overlay information may be mapped to particular features and corresponding feature locations in the identification data. For example, a known maintenance issue, retrieved based on the general identifier and related to the brakes of a particular make and model, may be mapped to the identified feature of the wheels in the identification data. As another non-limiting example, one or more of mileage, known maintenance issues, engine specifications, or other mechanical information may be mapped to a feature of a hood of the vehicle. At step 206, the image information overlay system may display the retrieved overlay information on the image based on the feature location. According to some embodiments, the image information overlay system may position the overlay information at or near the feature location identified in the image, such that some portion of the overlay information overlaps with the feature location. According to some embodiments, overlay information may be displayed at any location on the image. As a non-limiting example, overlay information that is general to the vehicle, and not related to any specific feature identified in the image, may be displayed at any location in the image, displayed in a pop-up near the image, or displayed in a location of the image that does not obscure the vehicle in the image.

Figure 3:
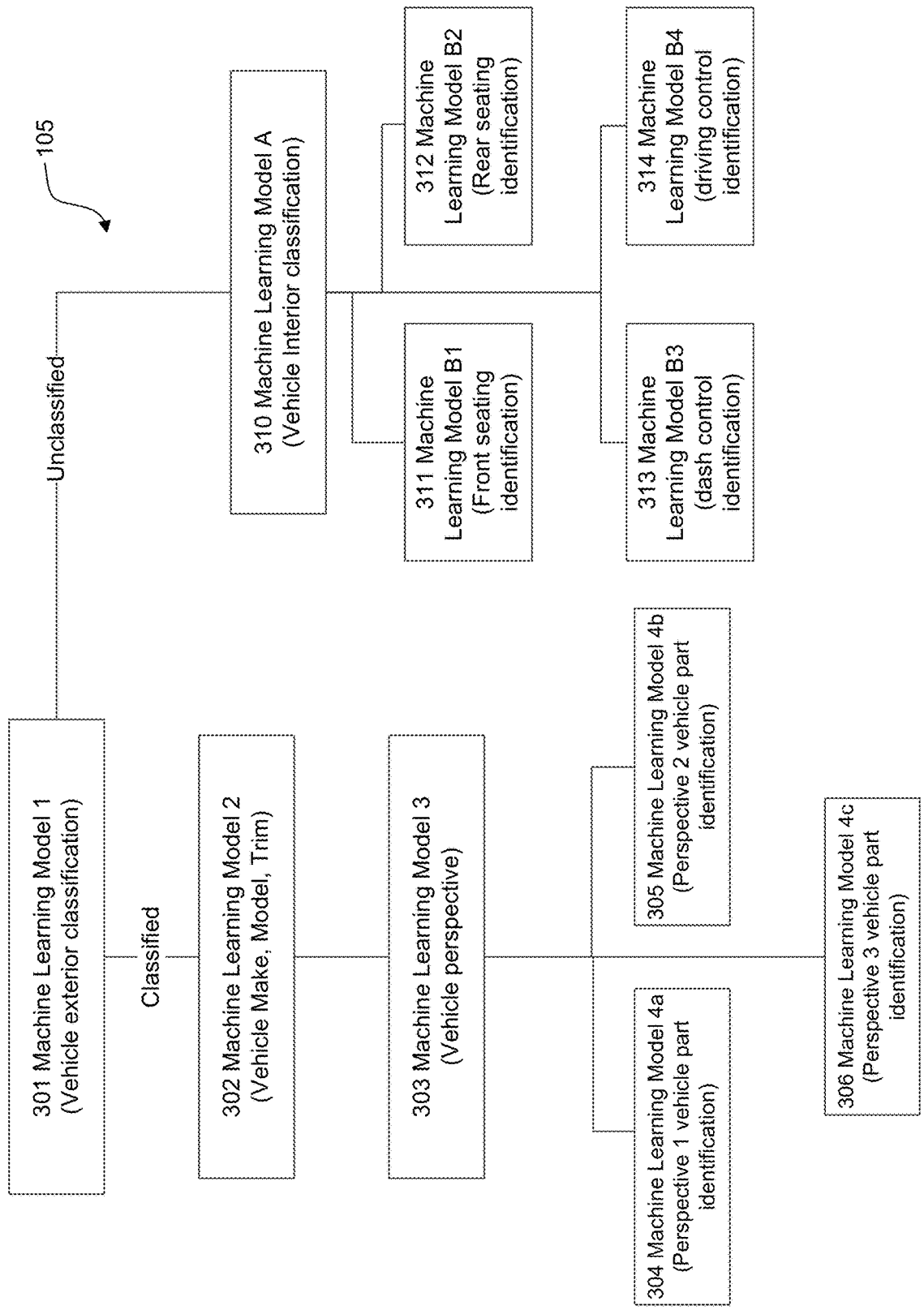
FIG. 3 is block diagram of an image classifier used for image information overlay according to some embodiments.

FIG. 3 is a block diagram of an image classifier 105 used for image information overlay according to some embodiments.

According to some embodiments, the tasks of classifying a vehicle image, identifying a feature location in the vehicle image, and generating identification data may be divided into multiple sub-tasks and distributed among multiple machine learning models. Distributing image classification into separate machine learning models may narrow the range of images that each machine learning model is configured to classify, and may increase the operation speed, improve classification accuracy, and reduce complexity of the machine learning models. For example, vehicle interior images may have much more variability and complexity than vehicle exterior images, while sharing few visual similarities. Using a single machine learning model to classify all images in the full range of possible vehicle exterior and interior images can increase difficulty of training the machine learning model and reduce the total accuracy and speed of the machine learning model. However, a machine learning model that can focus on determining if an image comprises a vehicle exterior, can filter the inputs to another machine learning model that can focus on determining if the image comprises a vehicle interior, simplifying the job of both machine learning models.

According to some embodiments, one or more machine learning models may be configured to generate identification data for an image as a result of classifying the image. Identification data may comprise an indicator that the image contains a vehicle, a general identifier indicating a make or make and model of the vehicle, or any feature of the vehicle. Features of the vehicle image that may be included in the identification data include, but are not limited to, one or more of a viewing perspective of the vehicle in the image, a body style, trim level, body kit, special paint job, accessory rack, front or rear bumpers, hood, number of doors, rear door, spare tire, wheels, wheel size and/or spoke number, alloy wheels, exhaust accessories, spoilers, scoops, a body part, a mechanical part, automatic/manual transmission, seat style, seating arrangement, seat material, climate control features, navigation, rear headrest screens, split rear folding seats, performance features, dashboard features, entertainment features, safety features, a sunroof or any other exterior or interior feature of a vehicle. A feature of the vehicle identified in the vehicle image may be represented in the identification data by a feature identifier. According to some embodiments, one or more of the machine learning models are configured to identify a feature location in the image for a feature identified in the image. According to some embodiments, the feature location comprises a point, defined by x and y coordinate values, identifying a location in the image where the feature was identified. According to some embodiments, the feature location comprises three or more points which, when connected by lines, provide a geometric shape that overlaps the feature identified in the image.

According to some embodiments illustrated in the diagram of FIG. 3, at step 301, the image classifier 105 uses a first machine learning model, machine learning model 1, to classify an image and generate identification data comprising a first general image class. The first general image class may comprise vehicle exterior images. According to some embodiments, the image may be classified as a vehicle if the image comprises a vehicle exterior, and the image may be unclassified if the image does not contain a vehicle exterior.

According to some embodiments, the image classifier 105 sends images classified as vehicle exterior images to a second machine learning model, machine learning model 2 302, for further classification. Machine learning model 2 302 may classify the image and generate identification data comprising a general identifier corresponding to one or more of multiple sub-classes within the first general image class. The general identifier may comprise vehicle make and model within the class of vehicle exterior images. Because the image sent to machine learning model 3 has already been classified as an image comprising a vehicle exterior, the classification of vehicle make and model is simplified and accuracy may be improved.

According to some embodiments, an image classified as comprising a particular make and model of vehicle may be sent to a third machine learning model, machine learning model 3 303, for further classification to generate identification data comprising a feature of the image. Machine learning model 3 may be configured to classify an image based on a vehicle perspective, such as a side perspective, front perspective, three-quarters perspective, rear perspective or any other perspective.

According to some embodiments, an image classified by machine learning model 3 may be sent for further classification to one or more of machine learning model 4a 304, machine learning model 4b 305, or machine learning model 4c 306, depending on which vehicle perspective the image was classified in by machine learning model 3. Each of machine learning models 4a, 4b, 4c, and 4d may be configured to identify features of the vehicle from a different perspective of the vehicle.

Different vehicle perspectives may expose different features of the vehicle in the image. For example, the wheels may be more visible in a side or three-quarters perspective than in a front perspective, while the hood and windshield may be more visible from a front perspective, and the rear bumper may be entirely hidden from the front perspective. Dividing the machine learning models into different perspectives can reduce the total number of distinct features each machine learning model is configured to identify.

According to some embodiments, machine learning models 4a, 4b, and 4c, are configured to identify features of the vehicle in the image comprising one or more of a body style, trim level, body kit, spoilers, scoops, special paint job, accessory rack, front or rear bumpers, hood, number of doors, rear door, spare tire, wheel size and/or spoke number, alloy wheels, exhaust accessories, or any other external features of a vehicle. A particular machine learning model may be configured to identify a different set of features depending on a make and model of the vehicle.

The order in which machine learning model 2 302 and machine learning model 3 303 classify the images need not be in the order illustrated in FIG. 3 and some machine learning models may be optional. For example, in some embodiments, machine learning model 3 303 may be eliminated and one or more of machine learning models 4a 304, 4b 305, or 4c 306 may be configured to further classify the image to detect individual features of the vehicle. Therefore the third machine learning model may refer to one or more of machine learning model 3 303, machine learning model 4a 304, machine learning model 4b 305, or machine learning model 4c 306. Machine learning models 4a 304, 4b 305, or 4c 306 may be configured to further classify the image in series or in parallel. According to some embodiments, the third machine learning model may comprise a single machine learning model configured to identify vehicle exterior features from any perspective.

According to some embodiments, the image classifier 105 may be configured to use machine learning models 4a 304, 4b 305, or 4c 306 to detect features common to all makes and models before sending the image to machine learning model 3 303 for classification by make and model.

According to some embodiments, the image classifier 105 may be configured to send images not classified in the first general image class to a second machine learning model, machine learning model A 310, for classification in a second general image class. The second general image class may comprise vehicle interior images. The image classifier 105 may be configured to treat images that are not classified as vehicle exterior images or vehicle interior images as unclassified images or images that contain no vehicle.

According to some embodiments, the image classifier 105 may be configured to send images classified as vehicle interior images to a third machine learning model comprising one or more of machine learning model B1 311, machine learning model B2 312, machine learning model B3 313, or machine learning model B4 314. Each of machine learning models B1, B2, B3 and B4 may be configured to detect a different set of one or more features of the vehicle interior. According to some embodiments, machine learning models B1, B2, B3, and B4 are configured to detect interior features including, but not limited to, automatic/manual transmission, seat style, seating arrangement, seat material, climate control features, navigation, rear headrest screens, split rear folding seats, performance features, dashboard features, entertainment features, safety features, a sunroof, or any other interior feature of a vehicle.

Figure 4:
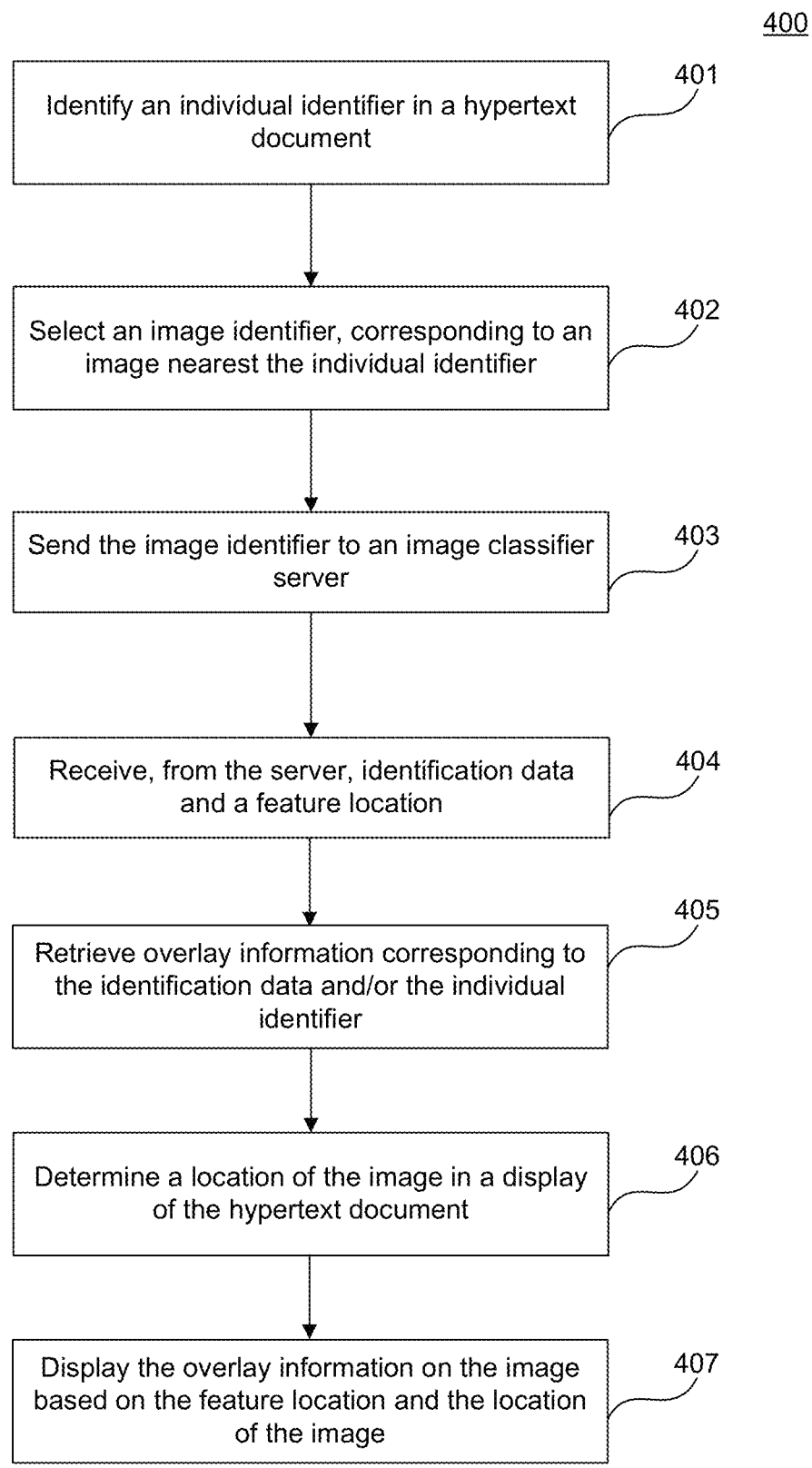
FIG. 4 is a flow chart for a method of image information overlay, performed by a client device, according to some embodiments.

FIG. 4 is a flow chart for a method of image information overlay, performed by a client 101 device, according to some embodiments. It is to be appreciated the steps may not occur in the order shown, not all steps may be performed, and additional steps may be performed, depending on various applications. According to some embodiments, a client 101 device includes a browser 102, and a plugin 103 augments the browser 102 functionality with one or more aspects of the image information overlay system.

At Step 401, the image information overlay system identifies an individual identifier in a hypertext document displayed in the web browser. The individual identifier may be a VIN, and the plugin 103 may be configured to recognize the VIN based on a distinct format including 17 characters, digits and letters, that act as a unique identifier for the vehicle.

At step 402, the image information overlay system selects an image identifier from the hypertext document. The image identifier may be a universal resource locator identifying a location where the image is stored. The plugin 103 may select the image identifier based on proximity to the individual identifier. The plugin 103 may select the image identifier nearest to the individual identifier in the display of the hypertext document in the web browser 103. The plugin 103 may select the image identifier based on one or more of the position of the image in the hypertext document, image size, a ratio of image length and width, or visibility of the image.

According to some embodiments, at step 403, the plugin 103 of the image information overlay system sends the image identifier to a server 104 hosting an image classifier 105. The plugin 103 may send the selected image identifier to the server 104 of the image information overlay system with a request for identification data and/or a feature location. At step 404, the plugin 103 receives, from the server 104, identification data and a feature location.

At step 405, the image information overlay system retrieves overlay information corresponding to the identification data and/or the individual identifier. The plugin 103 may access one or more vehicle databases to retrieve overlay information. The one or more vehicle databases may comprise a third-party database and/or a local database storing information generally applicable to vehicles based on the make and model of the vehicle, or a vehicle title database storing vehicle information based on VINs. The overlay information may comprise known maintenance issues, manufacturer recalls, or real-world fuel economy data corresponding to the make and model in the identification data, or overlay information specific to the vehicle, such as mileage, accident reports, maintenance history, or ownership history.

At step 406, the image information overlay system determines a location of the image in a display of the hypertext document. The plugin 103 may determine the location of the image based on a layout of a display of the hypertext document.

At step 407, image information overlay system may display the overlay information on the image based on the feature location and the location of the image in the display of the hypertext document. The location of the image may be a point comprising an x coordinate and a y coordinate in relation to a reference point of a display area of the browser 102. The feature location may be a point comprising an x coordinate and a y coordinate in relation to a reference point of the image. The plugin 103 may determine the location, in relation to a reference point of a display area of the browser, to display the overlay information based on a sum of the feature location in the image and the location of the image in the display area of the browser.

Figure 5:
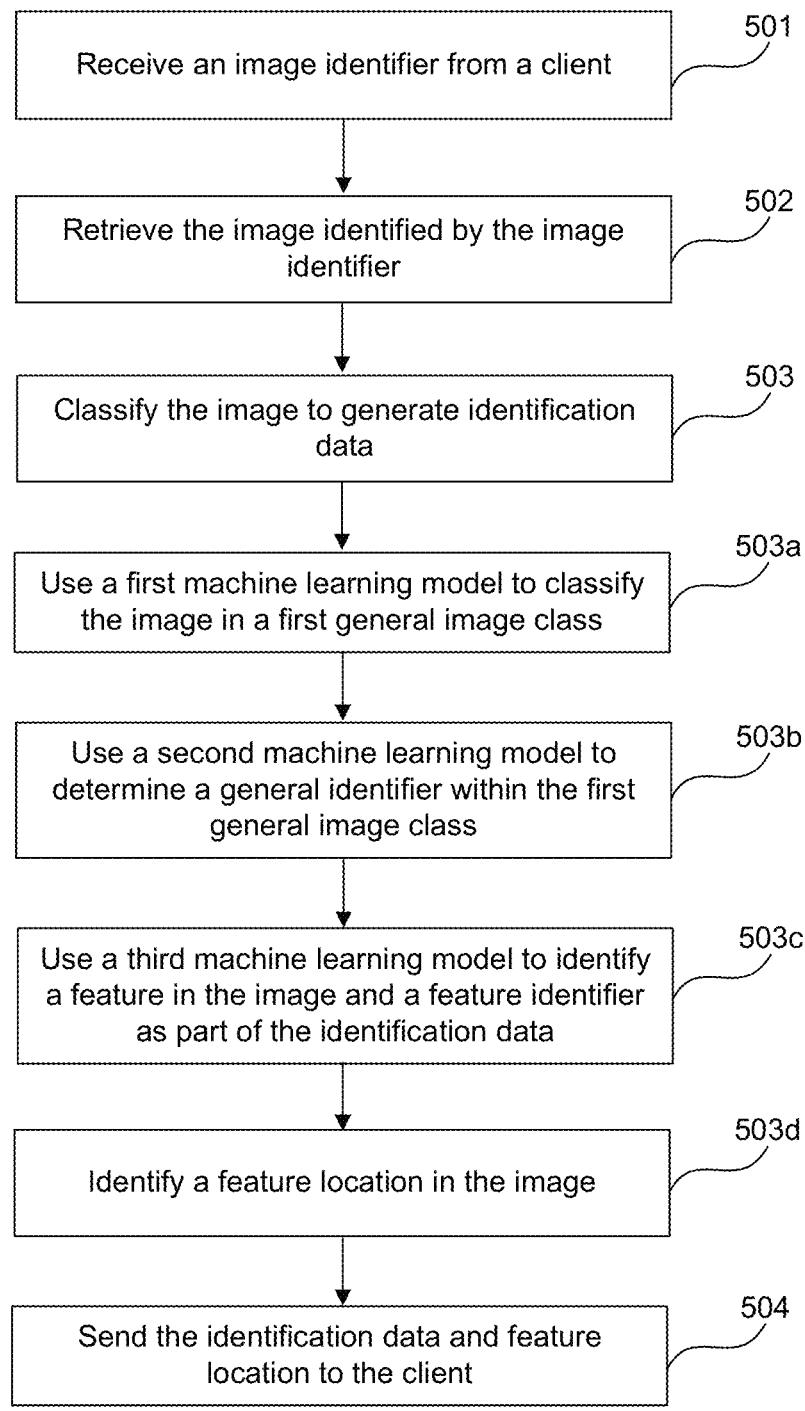
FIG. 5 is a flow chart for a method of image information overlay steps performed by a server according to some embodiments.

FIG. 5 is a flow chart for a method of image information overlay steps performed by a server according to some embodiments. It is to be appreciated the steps may not occur in the order shown, not all steps may be performed, and additional steps may be performed, depending on various applications.

According to some embodiments, the image classifier 105 may be implemented on a server 104, and the server 104 receives an image identifier from a client 101 at step 501. The image identifier may comprise a path to a local or remote storage location. The path may comprise a universal resource locator identifying a network location where the image is stored.

At step 502, image information overlay system retrieves the image identified by the image identifier. The image may be retrieved by accessing the network location identified by the universal resource locator and copying the image to local storage. In the case that the path identifies a local storage location, the image may be retrieved by copying the image into memory suitable for the image classifier 105 to perform image classification steps on the image.

At step 503, the image classifier 105 of the image information overlay system classifies the image and generates identification data. The image classification may be broken down into multiple image classification steps using multiple machine learning models configured to classify the image first in a general image class and then in a more specific image class within the general image class. One or more machine learning models of the image classifier 105 may be configured to identify a feature and a feature location in the image.

At step 503a, the image classifier 105 of the image information overlay system uses a first machine learning model to classify the image in a first general image class. The first general image class may comprise vehicle images. The first general image class may also comprise vehicle exterior images or vehicle interior images.

At step 503b, the image classifier 105 uses a second machine learning model to classify the image to determine a general identifier. The general identifier may be an identifier of one or more sub-classes within the first general image class. According to some embodiments, the general identifier comprises a vehicle make or a vehicle make and model.

At step 503c, the image classifier 105 uses a third machine learning model to identify a feature in the image. The third machine learning model may generate a feature identifier identifying the feature in the image. The third machine learning model may identify multiple features in the image and a feature identifier for each of the multiple features. The identification data may further comprise the feature identifier.

At step 503d, the image classifier 105 identifies a feature location in the image. The identification of the feature location in the image may be performed by a third machine learning model. The third machine learning model may perform identification of one or more features in the image, one or more feature identifiers corresponding to the one or more features, and may also perform identification of one or more corresponding feature locations corresponding to the identified features.

According to some embodiments, the server 104 may retrieve overlay information corresponding to the identification data. The server 104 may access one or more vehicle databases to retrieve overlay information. The one or more vehicle databases may comprise a third-party database and/or a local database storing information generally applicable to vehicles based on the make and model of the vehicle. The overlay information may comprise known maintenance issues, manufacturer recalls, or real-world fuel economy data corresponding to the make and model in the identification data.

Overlay information may be mapped to particular features and corresponding feature locations in the identification data. For example, a known maintenance issue related to the brakes of a particular make and model may be mapped to the identified feature of the wheels in the identification data. As another example, one or more of mileage, known maintenance issues, engine specifications, or other mechanical information may be mapped to a feature of a hood of the vehicle.

At step 504, the server 104 sends the identification data, feature location, and/or overlay information to the client 101. The identification data and feature location may be viewed as separate data or the feature location may be included in the identification data without departing from the spirit and scope of the disclosed embodiments.

Figure 6:
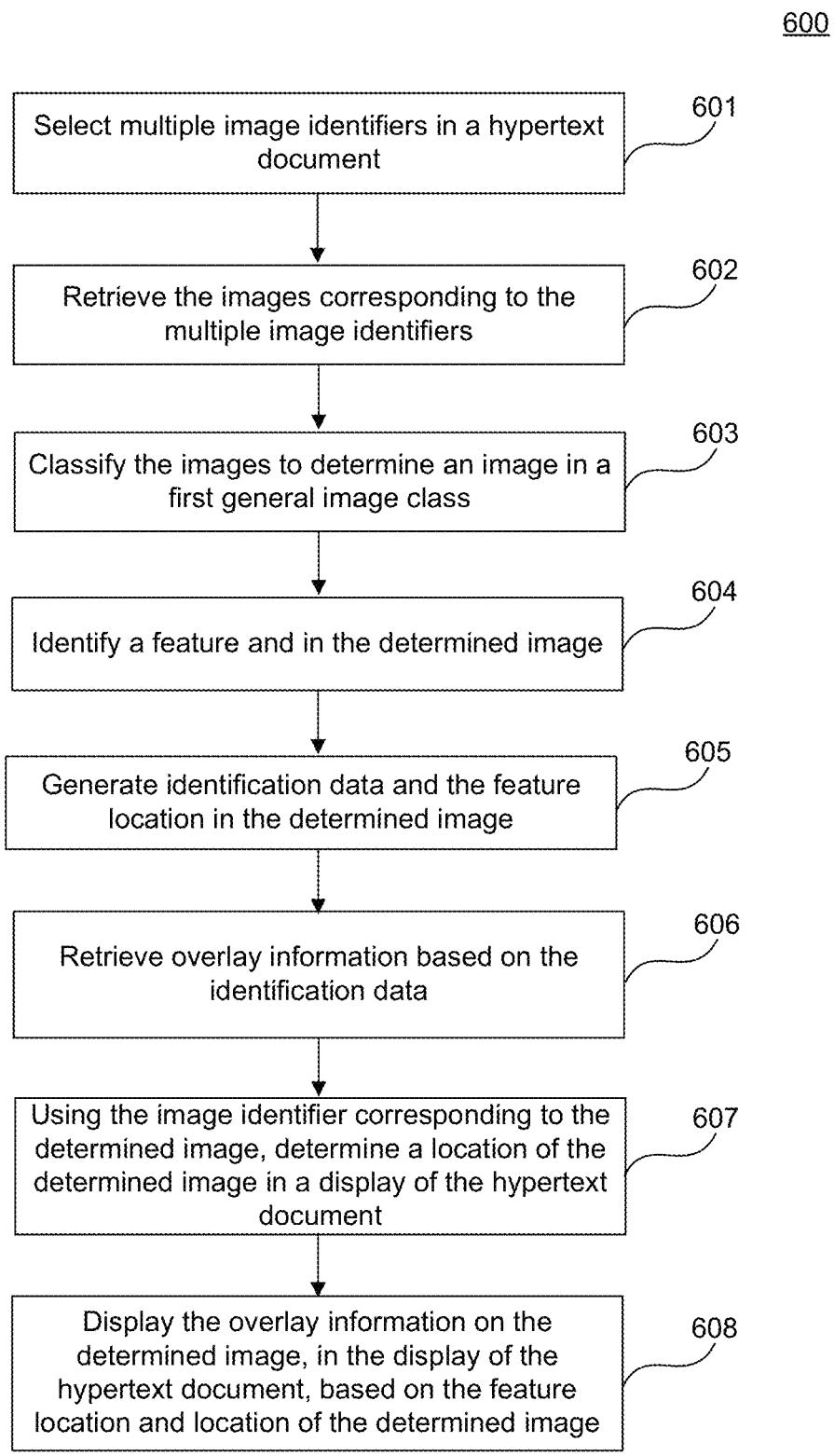
FIG. 6 is a flow chart for a method of image information overlay for multiple images according to some embodiments.

FIG. 6 is a flow chart for a method of image information overlay for multiple images according to some embodiments. It is to be appreciated the steps may not occur in the order shown, not all steps may be performed, and additional steps may be performed, depending on various applications.

The image information overlay system may be configured to perform image information overlay on multiple images in the display of a hypertext document. The image classifier 105 may be configured to perform image classification on multiple images using multiple image identifiers. As described in reference to FIG. 2, the image classifier 105 may be configured to treat images that are not classified as vehicle exterior images or vehicle interior images as unclassified images or images that contain no vehicle. For images that contain no vehicle, the image classifier may be configured to skip the feature identification machine learning models and return empty identification data and no feature location corresponding to the non-vehicle images. This feature prevents display of overlay information on non-vehicle images that may be displayed in the display area of the browser 102.

At step 601, the image information overlay system selects multiple image identifiers in the hypertext document. The hypertext document may comprise one or more images and a vehicle listing with an individual identifier identifying the vehicle. Some of the one or more images in the hypertext document may be images of the vehicle corresponding to the vehicle listing and some of the one or more images in the hypertext document may be non-vehicle images that are unrelated to the vehicle of the vehicle listing.

The image information overlay system may select multiple image identifiers from the hypertext document based on attributes of the images corresponding to the image identifiers. Attributes may comprise proximity of the image to the individual identifier in a display of the hypertext document, position of the image in the hypertext document, image size, a ratio of image length and width, or visibility of the image in a display of the hypertext document.

According to some embodiments, images unrelated to the vehicle of the vehicle listing may not be selected, based on the attributes of the images. According to some embodiments, images that are clearly not vehicle images, based on these attributes, are not sent to the image classifier 105 for image classification. The selected multiple image identifiers may correspond to different images of the vehicle. One or more of the selected multiple image identifiers may correspond to non-vehicle images displayed in the hypertext document. According to some embodiments, the image classifier may be configured to distinguish between vehicle images and non-vehicle images and identify vehicle images among the multiple images corresponding to the selected multiple image identifiers.

According to some embodiments, at step 602, the image information overlay system retrieves the multiple images corresponding to the multiple image identifiers. According to some embodiments, at step 603, the image information overlay system classifies the images to determine one or more images, among the multiple images, in the first general image class. According to some embodiments. The first general image class may comprise vehicle images. Image classification may be performed according to any of the embodiments described herein.

According to some embodiments, at step 604, the image information overlay system identifies a feature in the determined one or more images that were classified in the first general image class. The image information overlay system may identify multiple features in each of multiple images classified in the first general image class. According to some embodiments, at step 605, the image information overlay system generates identification data and identifies the feature location in the determined one or more images. The image information overlay system may generate identification data and identify the feature location for multiple features identified in each of multiple images classified as vehicle images. The identification data may include the image identifiers for the determined one or more images and one or more feature identifiers corresponding to one or more identified features in any of the determined one or more images.

According to some embodiments, the image information overlay system may be configured to filter out images that the image classifier 105 fails to classify as a vehicle image. The image information overlay system may perform feature identification and generate identification data for multiple images classified as vehicle images, and perform no feature identification and no identification data for images that the image classifier 105 fails to classify as a vehicle image. According to some embodiments, image identifiers of the non-vehicle images are excluded from the identification data generated by the image classifier 105, and, therefore, no overlay information is displayed on the non-vehicle images.

According to some embodiments, at step 606, the image information overlay system retrieves overlay information based on the identification data of the determined one or more images and/or the individual identifier. Overlay information may be retrieved according to any of the embodiments disclosed herein. According to some embodiments, at step 607, using the image identifiers corresponding to the determined one or more images, the image information overlay system determines image locations corresponding to the images identified as vehicle images by the image classifier 105. The image locations may be locations in the display of the hypertext document.

According to some embodiments, at step 608, the image information overlay system may display the overlay information on the one or more determined images, in the display of the hypertext document, based on the feature locations and the image locations of the one or more determined images. The image information overlay system may display the overlay information in response to the determined image being visible in the display of the hypertext document and may update the content or position of the displayed overlay information in response to changes in the display of the hypertext document.

Figure 7:
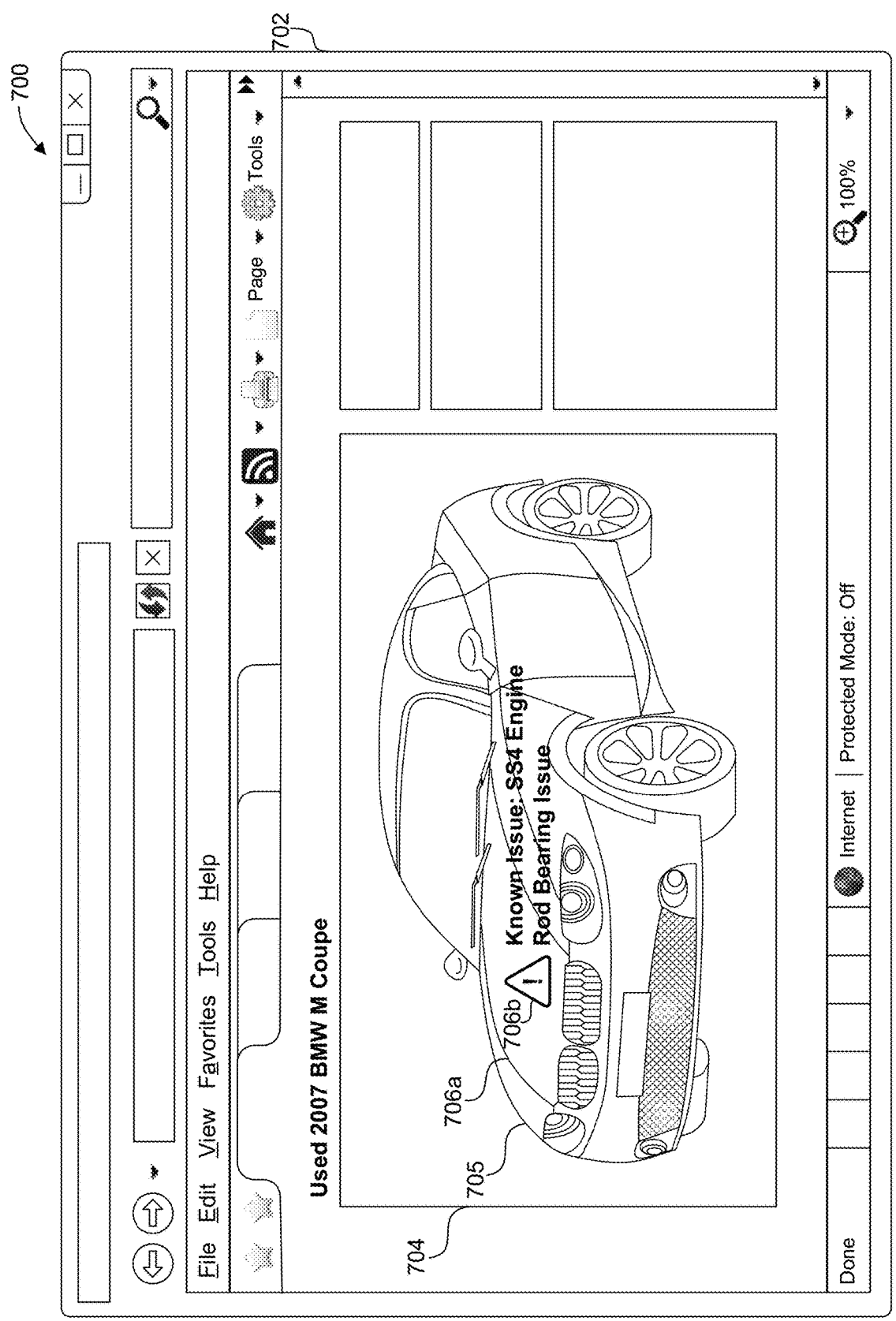
FIG. 7 is a non-limiting example diagram of a web browser interface for image information overlay according to some embodiments.

FIG. 7 is a non-limiting example diagram of a web browser 702 interface for image information overlay according to some embodiments.

According to some embodiments, a web browser 702 may be displayed in a window of a graphical user interface 700 of a computer system. The web browser 702 may display the image 704 within the display of a hypertext markup language document. In this non-limiting example, the vehicle 705 is displayed in a ¾ front view. The image classifier 105 may identify one or more features of the vehicle 705 displayed in the image 704. As a non-limiting example, the hood 706a of the vehicle 705 is identified and overlay information 706b related to the vehicle 705 hood 706a is displayed on or near the hood 706a in the image 704. Other overlay information may also be displayed overlaid on a particular feature of the vehicle 705, related to the overlay information, or in a general location on the image 704.

Figure 8:
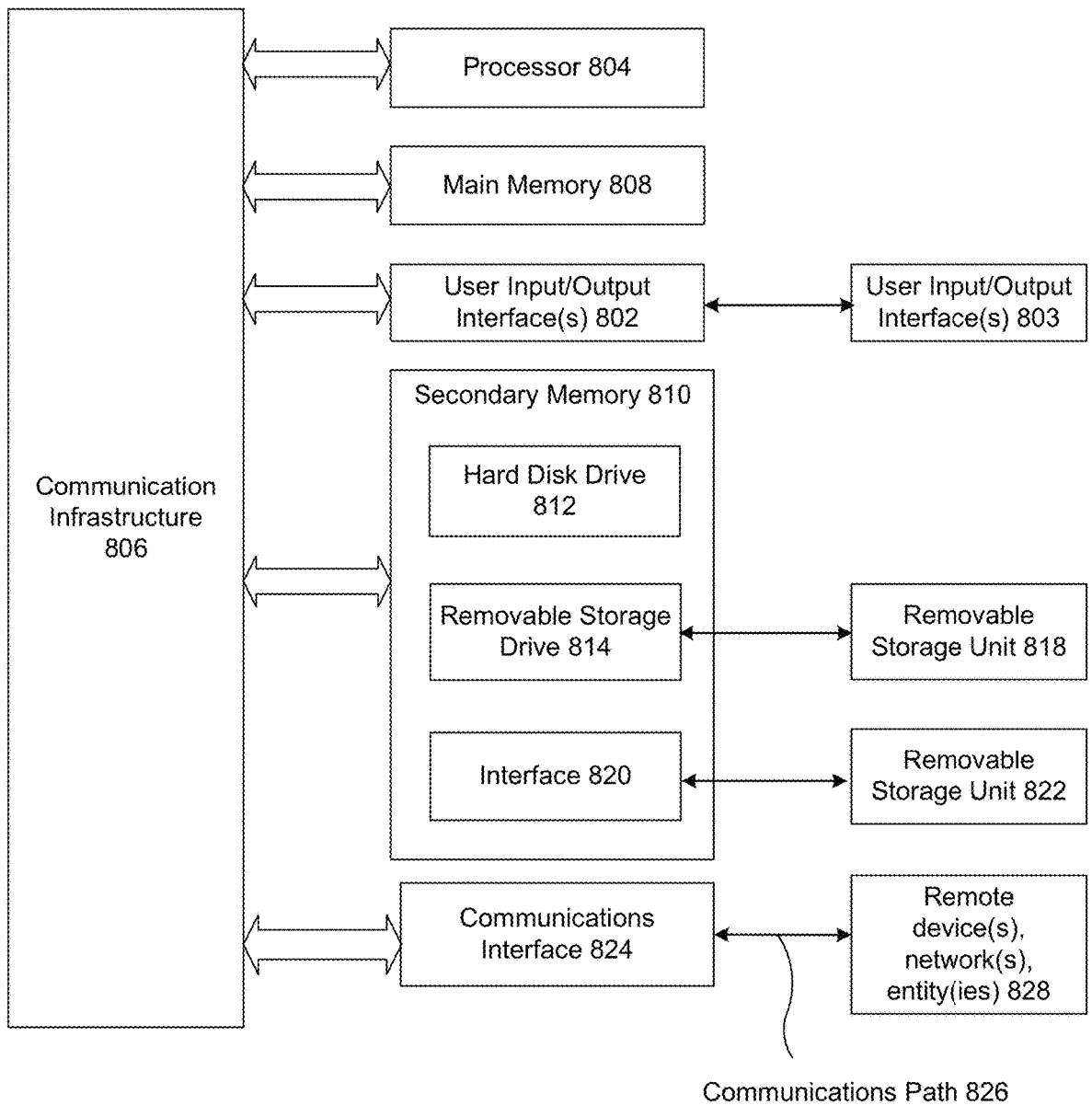
FIG. 8 is a block diagram of an example computer system useful for implementing various embodiments disclosed herein.

FIG. 8 is a block diagram of an example computer system useful for implementing various embodiments disclosed herein.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache and/or registers. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. An apparatus, comprising:
a memory; and
at least one processor coupled to the memory, wherein the at least one processor and the memory are configured to:
send, to a server device, a selected image identifier for identification of at least one feature in an image displayed in a hypertext document;
receive, from the server device, identification data associated with the image, wherein the identification data includes at least one feature identifier and at least one feature location that corresponds to the at least one feature identifier;
retrieve overlay information based at least on a feature of the identification data;
determine a location of the image displayed in the hypertext document based at least on a layout of the display of the hypertext document; and
display the overlay information on the image based at least on a feature location of the at least one feature location and the location of the image.

2. The apparatus of claim 1, wherein the at least one processor and the memory are further configured to:
identify an individual identifier in the hypertext document, wherein the individual identifier includes a vehicle identification number (VIN) that is included in the hypertext document; and
select the image identifier based at least on a proximity between the image identifier and the individual identifier in the display of the hypertext document.

3. The apparatus of claim 1, wherein the at least one processor and the memory are further configured to:
display the overlay information at or near the at least one feature identified in the image, wherein the overlay information includes at least one of: a maintenance issue information, engine specification information, mileage information, manufacturer recall information, fuel-economy information, or any combination thereof.

4. The apparatus of claim 2, wherein
the feature location corresponds to a feature identified in the image,
the identification data further includes a general identifier, and
the general identifier indicates a make and a model of a vehicle in the image.

5. The apparatus of claim 4, wherein to retrieve the overlay information, the memory and the at least one processor are configured to retrieve the overlay information from at least one vehicle database, wherein the overlay information corresponds to the general identifier.

6. The apparatus of claim 1, wherein the server device is configured to:
classify the image identified by the image identifier to identify the image in at least one image class; and
identify the at least one feature and the at least one feature location that corresponds to the at least one feature.

7. The apparatus of claim 6, wherein the server device is further configured to:
generate the identification data, wherein the identification data includes the at least one feature location, the at least one feature identifier corresponding to the at least one feature, and the image identifier corresponding to the image.

8. A computer-implemented method, comprising:
sending, to a server device, a selected image identifier for identification of at least one feature in an image displayed in a hypertext document;
receiving, from the server device, identification data associated with the image, wherein the identification data includes at least one feature identifier and at least one feature location that corresponds to the at least one feature identifier;
retrieving overlay information based at least on a feature of the identification data;
determining a location of the image displayed in the hypertext document based at least on a layout of the display of the hypertext document; and
displaying the overlay information on the image based at least on a feature location of the at least one feature location and the location of the image.

9. The computer-implemented method of claim 8, further comprising:
identifying an individual identifier in the hypertext document, wherein the individual identifier includes a vehicle identification number (VIN) that is included in the hypertext document; and selecting the image identifier based at least on a proximity between the image identifier and the individual identifier in the display of the hypertext document.

10. The computer-implemented method of claim 8, wherein the overlay information is displayed at or near the at least one feature identified in the image, and the overlay information includes at least one of: a maintenance issue information, engine specification information, mileage information, manufacturer recall information, fuel-economy information, or any combination thereof.

11. The computer-implemented method of claim 9, wherein the feature location corresponds to a feature identified in the image, the identification data further includes a general identifier, and the general identifier indicates a make and a model of a vehicle in the image.

12. The computer-implemented method of claim 11, wherein the retrieving of the overlay information further comprises retrieving the overlay information from at least one vehicle database, wherein the overlay information corresponds to the general identifier.

\* \* \* \* \*